United States Patent
Ho (10) Patent No.: US 7,252,231 B2
(45) Date of Patent: Aug. 7, 2007

(54) CARD ADAPTER

(75) Inventor: Chia-Nan Ho, Taipei (TW)

(73) Assignee: Wieson Technologies Co., Ltd., Taipei Hsien (TW)

( * ) Notice: Subject to any disclaimer, the term of this patent is extended or adjusted under 35 U.S.C. 154(b) by 273 days.

(21) Appl. No.: 10/908,983

(22) Filed: Jun. 3, 2005

(65) Prior Publication Data

US 2006/0273173 A1    Dec. 7, 2006

(51) Int. Cl.
G06K 7/06 (2006.01)
(52) U.S. Cl. ............... 235/441; 235/444; 235/453; 235/492
(58) Field of Classification Search ............ 235/441, 235/444, 453, 492, 486; 361/737; 439/79, 439/541.5
See application file for complete search history.

(56) References Cited

U.S. PATENT DOCUMENTS

| | | | |
|---|---|---|---|
| 5,224,873 A * | 7/1993 | Duffet et al. .............. 439/326 |
| 5,334,046 A * | 8/1994 | Brouillette et al. ...... 439/541.5 |
| 5,490,791 A * | 2/1996 | Yamada et al. ............. 439/159 |
| 5,697,802 A * | 12/1997 | Kawabe ...................... 439/326 |
| 5,763,862 A * | 6/1998 | Jachimowicz et al. ...... 235/380 |
| 5,833,478 A * | 11/1998 | Tseng et al. ................ 439/326 |
| 6,189,786 B1 * | 2/2001 | Itou et al. ................... 235/379 |
| 6,471,550 B2 * | 10/2002 | Maiterth et al. ............ 439/631 |
| 6,890,203 B2 * | 5/2005 | Matsunaga et al. ......... 439/331 |
| 2004/0092159 A1 * | 5/2004 | Tsai ........................ 439/541.5 |

* cited by examiner

Primary Examiner—Ahshik Kim (57) ABSTRACT

A card adapter is disclosed to include a connector electrically connected to a circuit board, a locating frame fixedly fastened to the circuit board, and a sliding cardholder, which has a holder base pivotally coupled to the locating frame through a sliding joint and defining two vertically spaced accommodating chambers for receiving different electronic cards, and terminals mounted in a partition board between the accommodating chambers, and the terminals each having a front contact portion respectively suspending in the first or second accommodating chamber for the contact of the inserted electronic cards and a rear connecting portion positioned in a respective terminal groove at a plug plate at the rear side of the partition board for insertion with the plug plate into the connector to contact a respective terminal in the connector.

13 Claims, 9 Drawing Sheets

CARD ADAPTER

BACKGROUND OF THE INVENTION

1. Field of the Invention

The present invention relates to an electric connector and more particularly, to a card adapter, which uses a partition board to hold multiple sets of terminals for the contact of different electronic cards so that the height of the adapter is minimized to meet light, thin, short and small electronic product characteristics.

2. Description of the Related Art

A variety of high-tech electronic devices has been developed and has appeared on the market. These electronic devices such as computers, mobile telephones, digital cameras, and etc. provided sophisticated functions to satisfy different demands. Further, electronic chip cards have been intensively used in mobile electronic devices such as mobile telephones, PDAs, etc. for identification recognition and/or data storage. These mobile electronic devices have a card connector or adapter for receiving a SIM (Subscriber Identity Module) card or memory card.

Figure 9:
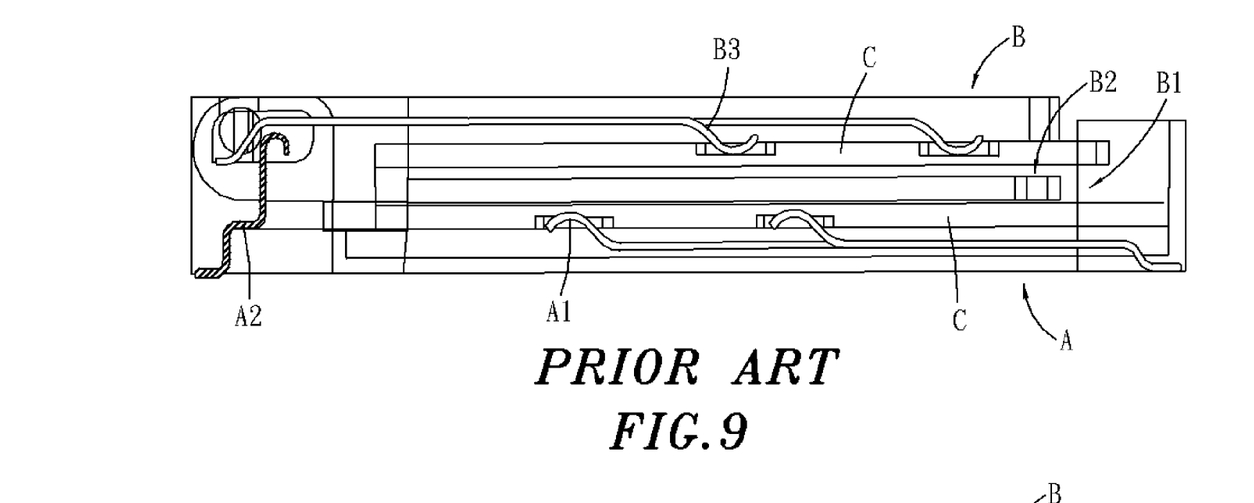
FIG. 9 is a sectional side view of a card adapter according to the prior art (before installation).
Figure 10:
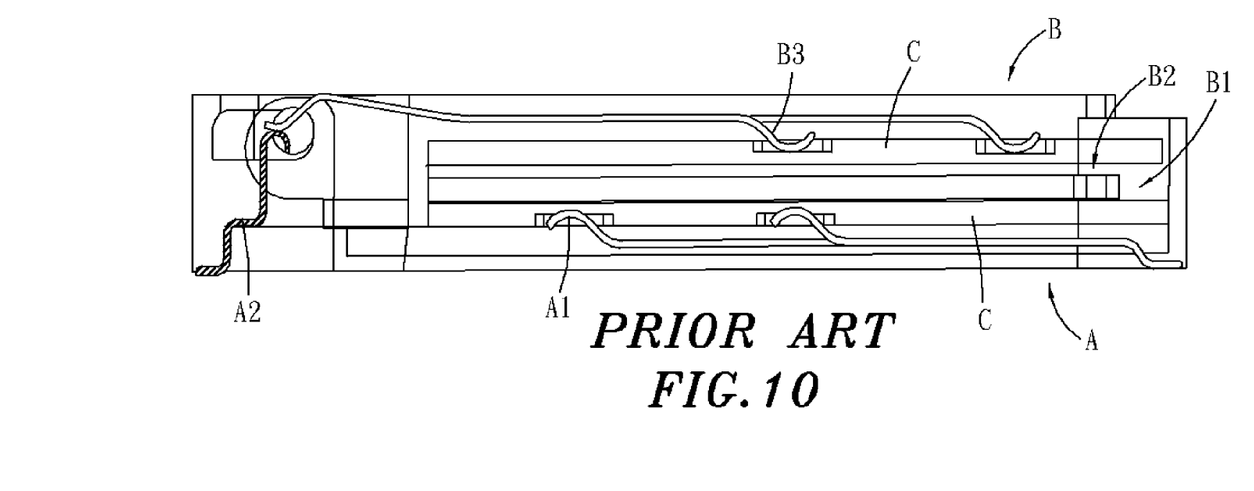
FIG. 10 is a sectional side view of a card adapter according to the prior art (after installation).

Following the market trend toward light, thin, short and small electronic device characteristics, a card adapter must be made as smaller as possible and capable of receiving a plurality of electronic cards. FIGS. 9 and 10 show a card adapter according to the prior art. According to this design, the card adapter comprises a base A fixedly mounted in a circuit board (not shown), a sliding cardholder B, which is coupled to the base A and comprises a first accommodating chamber B1 and a second accommodating chamber B2 disposed at different elevations, a set of first terminals A1 mounted in the base A for the contact of the electronic card C that is inserted into the first accommodating chamber B1, a set of second terminals B3 mounted in the sliding cardholder B for the contact of the electronic card C that is inserted into the second accommodating chamber B2. After insertion of the electronic cards C into the first accommodating chamber B1 and the second accommodating chamber B2, the sliding cardholder B is moved relative to the base A to force the electronic card C in the first accommodating chamber B1 into contact with the first terminals A1. The electronic card C that is inserted into the second accommodating chamber B2 is automatically set into contact with the second terminals B3. When moving the sliding cardholder B to force the electronic card C in the first accommodating chamber B1 into contact with the first terminals A1, the second terminals B3 are respectively force into respective connecting terminals A2 that are mounted in the base A and electrically connected to the circuit board that carries the base A.

The aforesaid design of card adapter is still not satisfactory in function because of the following drawbacks:

Because the first terminals A1 and the second terminals B3 are respectively mounted in the base A and the sliding cardholder B, the card adapter must have a certain height to hold these two sets of terminals. Therefore, this design of card adapter does not meet the requirements for light, thin, short and small electronic device characteristics.

According to the aforesaid design, the sliding cardholder B must be moved relative to the base A to force the electronic card C that is inserted into the first accommodating chamber B1 into contact with the first terminals A1. However, the electronic card C that is inserted into the second accommodating chamber B2 is automatically set into contact with the second terminals B3. Therefore, when making the card adapter, the distance between the first terminals A1 and the connecting terminals A2 must be accurately controlled so that the second terminals B3 can be accurately forced into contact with the electronic card C in the first accommodating chamber B1 after the sliding cardholder B has been set into position. This consideration complicates the manufacturing process, resulting in a low yield rate and a high manufacturing cost.

This design of card adapter has no guide means to guide the second terminals B3 into contact with the connecting terminals A2 when moving the sliding cardholder B into position. Therefore, when moving the sliding cardholder B into position, the second terminals B3 may be forced against the connecting terminals A2, thereby causing deformation or damage of the terminals. When the card adapter is damaged, the user must deliver the card adapter to the supplier for repair.

Therefore, it is desirable to provide a card adapter that eliminates the aforesaid drawbacks.

SUMMARY OF THE INVENTION

The present invention has been accomplished under the circumstances in view. It is therefore the main object of the present invention to provide a card adapter, which meets the requirements for light, thin, short and small electronic device characteristics. It is another object of the present invention to provide a card adapter, which allows a relatively greater locational tolerance, thereby simplifying the fabrication to reduce the manufacturing cost and to improve the yield rate. It is still another object of the present invention to provide a card adapter, which is durable in use. To achieve these and other objects and according to one aspect of the present invention, the card adapter comprises a connector electrically connected to a circuit board, a locating frame fixedly fastened to the circuit board, and a sliding cardholder for receiving different electronic cards and electrically connecting the electronic cards to the connector and the circuit board. The sliding cardholder comprises a holder base, which is pivotally coupled to the locating frame through a sliding joint and defines therein two vertically spaced accommodating chambers for receiving different electronic cards, and terminals mounted in a partition board between the accommodating chambers. The terminals of the sliding cardholder each have a front contact portion respectively suspending in the accommodating chambers for the contact of the inserted electronic cards and a rear connecting portion for connection to a respective terminal in the connector. According to another aspect of the present invention, the sliding cardholder comprises a plug plate extending from the partition board for supporting the rear connecting portions of the terminals of the sliding cardholder and inserting into the connector to force the rear connecting portions of the terminals into contact with respective terminals in the connector. According to still another aspect of the present invention, the plug plate has terminal grooves for the positioning of the rear connecting portions of the terminals of the sliding cardholder and for guiding the rear connecting portions of the terminals of the sliding cardholder into contact with respective terminals in the connector positively without damage.

DETAILED DESCRIPTION OF THE PREFERRED EMBODIMENT

Figure 1:
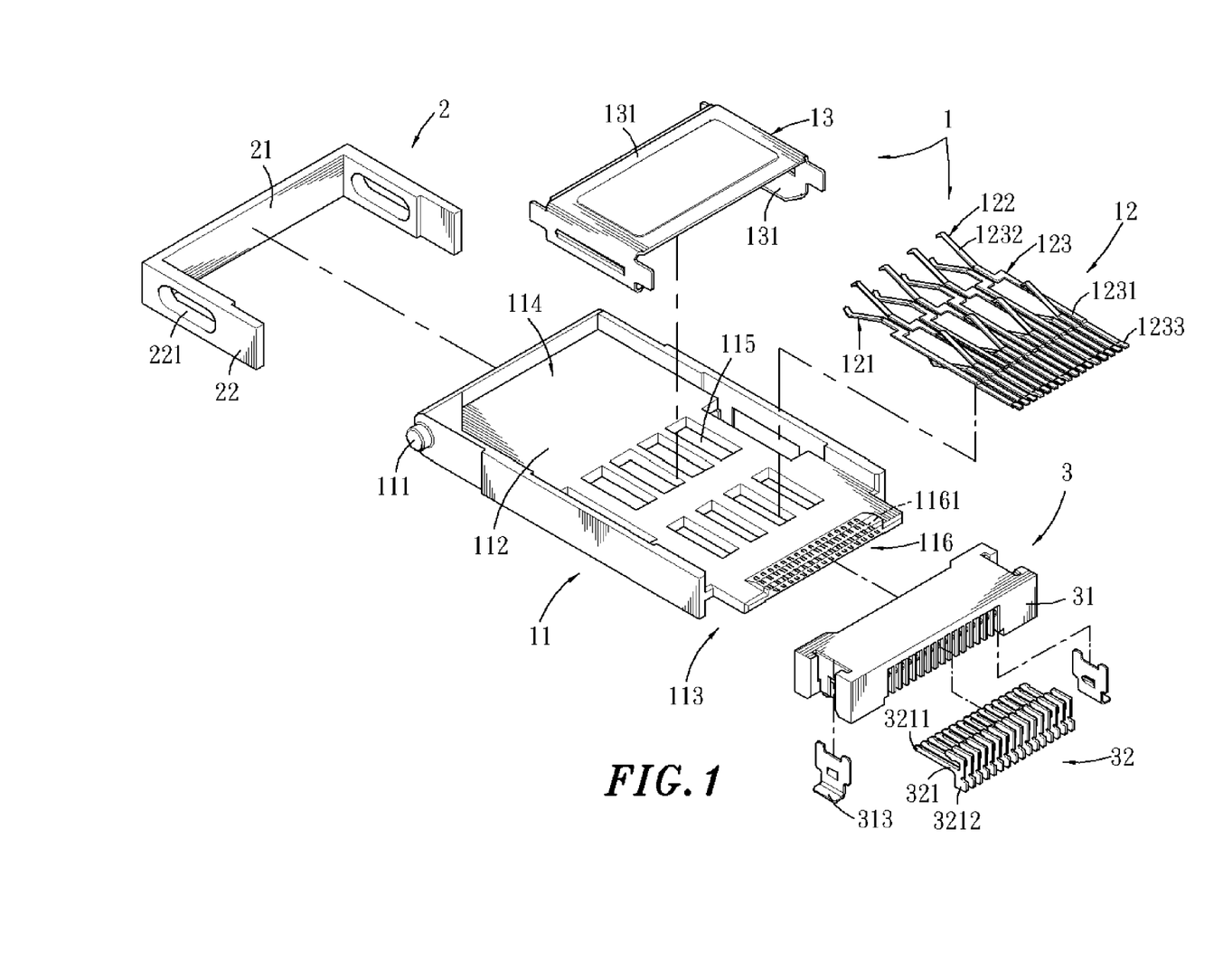
FIG. 1 is an exploded view of a card adapter according to the present invention.
Figure 2:
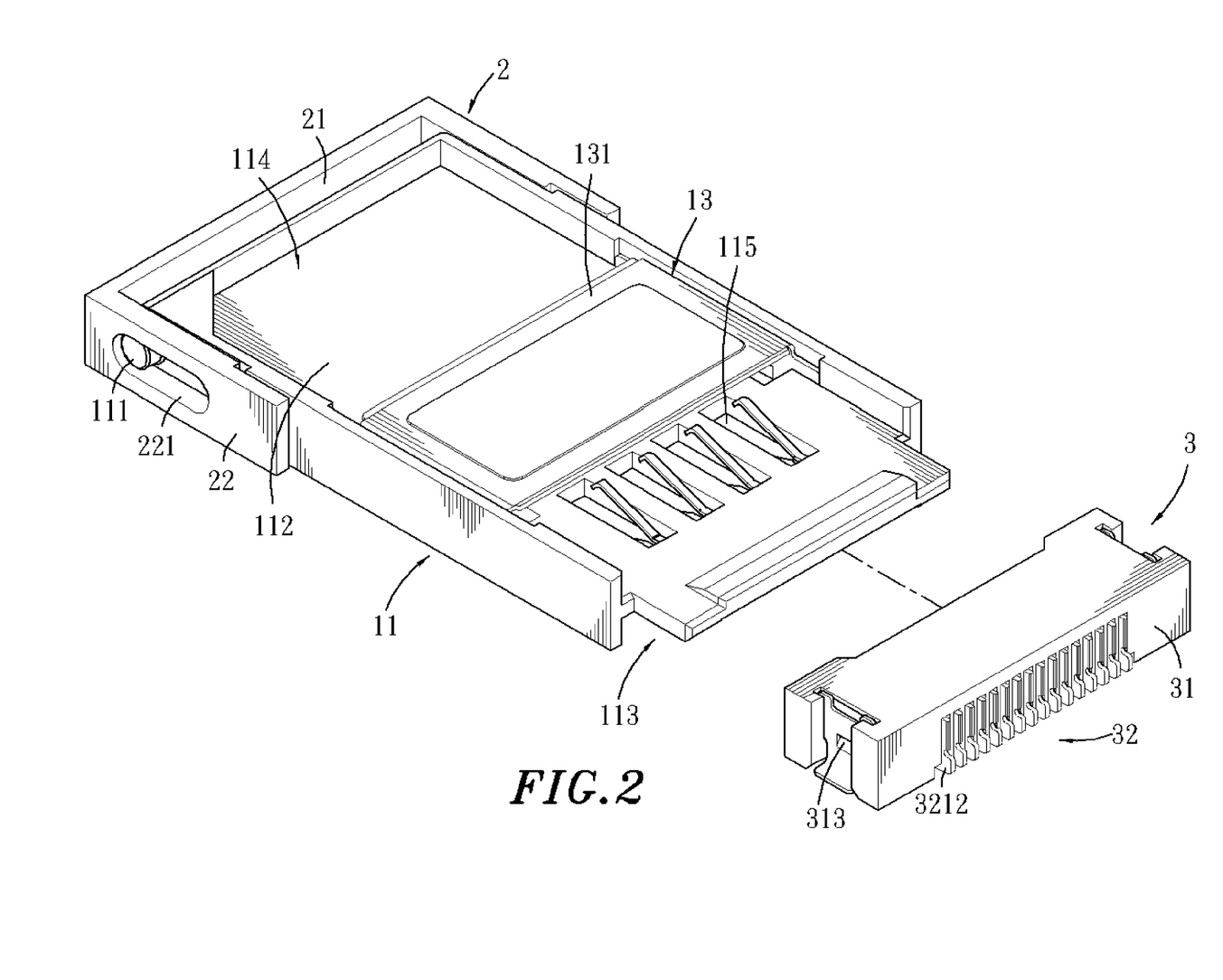
FIG. 2 is an elevational view of the card adapter according to the present invention.

Referring to FIGS. 1 and 2, a card adapter in accordance with the present invention is shown comprised of a sliding cardholder 1, a locating frame 2, and connector 3.

The sliding cardholder 1 comprises a holder base 11, a terminal unit 12, and a cover 13. The holder base 11 is a rectangular hollow member, having two pivot rods 111 symmetrically disposed at two opposite lateral sides near one end, a partition board 112 substantially horizontally disposed on the inside and dividing the holding space of the holder base 11 into a first accommodating chamber 113 at the bottom side and a second accommodating chamber 114 at the top side, a plurality of slots 115 cut through the partition board 112 in communication between the first accommodating chamber 113 and the second accommodating chamber 114 and arranged in two rows, a plug plate 116 forwardly extending from one end of the partition board 112 to the outside of the holder base 11, and a plurality of terminal grooves 1161 formed in the plug plate 116 and arranged in two rows. The terminal unit 12 includes a first terminal set 121 and a second terminal set 122 respectively inserted through the slots 115 of the holder base 11. The first terminal set 121 and the second terminal set 122 each comprise a plurality of terminals 123 respectively inserted through the terminal grooves 1161 into the slots 115, each having a base 1231, a front contact portion 1232 extending from one end of the base 1231 and suspending in the first accommodating chamber 13 and second accommodating chamber 14, and a rear connecting portion 1233 extending from the other end of the base 1231 and rested in one terminal groove 1161. The cover 13 is mounted inside the holder base 11, having top and bottom panels 131 respectively suspending at the bottom side of the first accommodating chamber 113 and the top side of the second accommodating chamber 114.

The locating frame 2 comprises an elongated frame base 21 and two parallel arms 22 respectively perpendicularly extending from the two distal ends of the elongated frame base 21. The arms 22 each have a longitudinally extending sliding slot 221 respectively coupled to the pivot rods 111 of the holder base 11.

The connector 3 comprises an electrically insulative housing 31 and a terminal unit 32. The housing 31 comprises a front receiving chamber 311 adapted to receive the plug plate 116 of the holder base 11 of the sliding cardholder 1, a plurality of bottom mounting rods 312, and two metal grounding plates 313 fixedly provided at two opposite lateral sides. The terminal unit 32 comprises a plurality of terminals 321. The terminals 321 are respectively inserted into the housing 31, each having a front contact portion 3211 suspending in the front receiving chamber 311 and a rear bonding portion 3212 suspending outside the housing 31.

Figure 3:
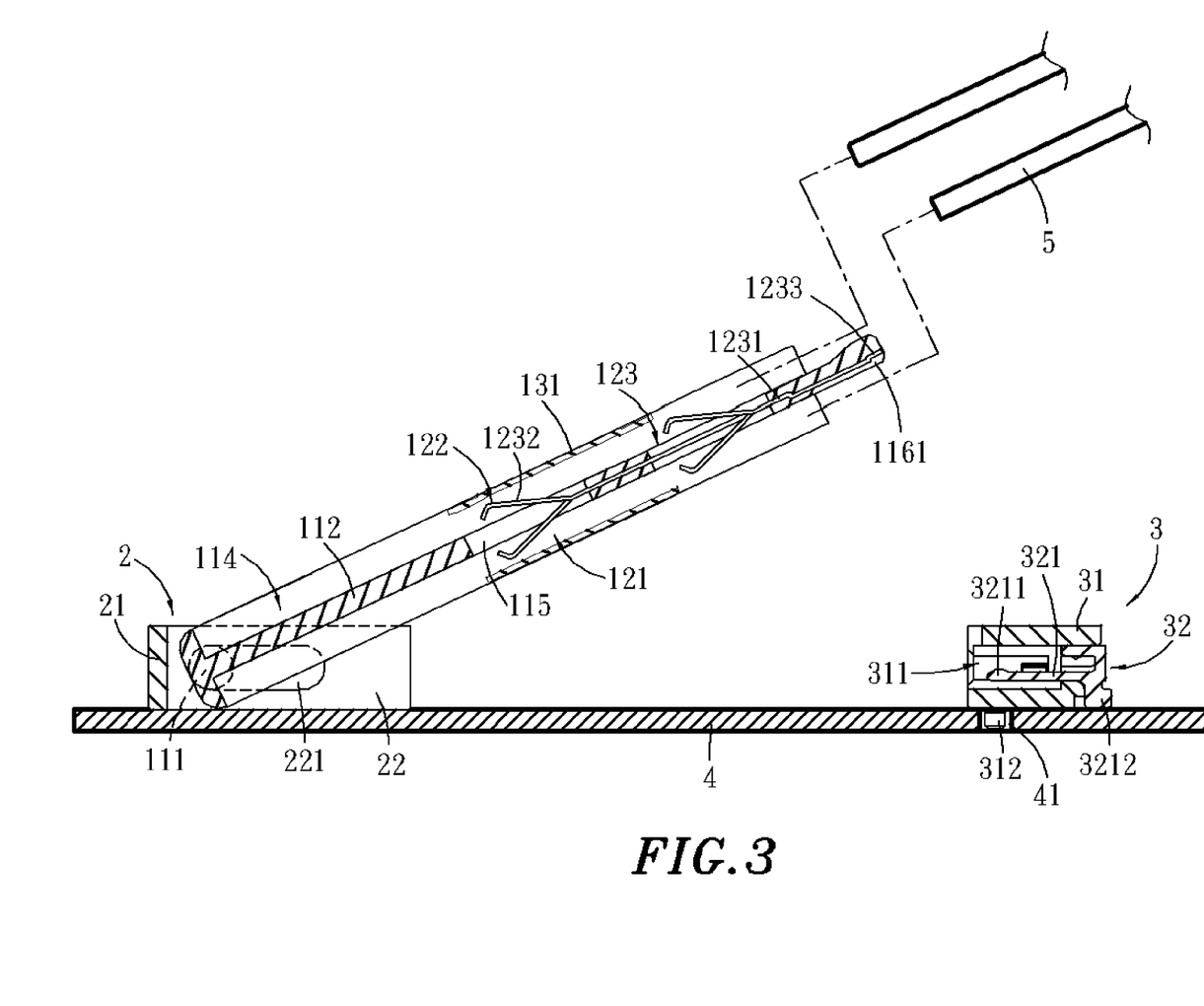
FIG. 3 is a side view in section of the card adapter according to the present

The installation of the card adapter is simple and outlined hereinafter with reference to FIG. 3 and FIGS. 1 and 2 again. The connector 3 is installed in a circuit board 4 with the bottom mounting rods 312 respectively fastened to respective mounting through holes 41 at the circuit board 4, and then the rear bonding portions 3212 of the terminals 321 and the metal grounding plates 313 of the connector 3 are respectively soldered to respective contacts (not shown) at the circuit board 4, and then the locating frame 2 is fixedly fastened to the circuit board 4 at a location properly spaced from the connector 3, and then the pivot rods 111 of the holder base 11 of the sliding cardholder 1 are respectively coupled to the sliding slots 221 of the arms 22 of the locating frame 2.

Figure 4:
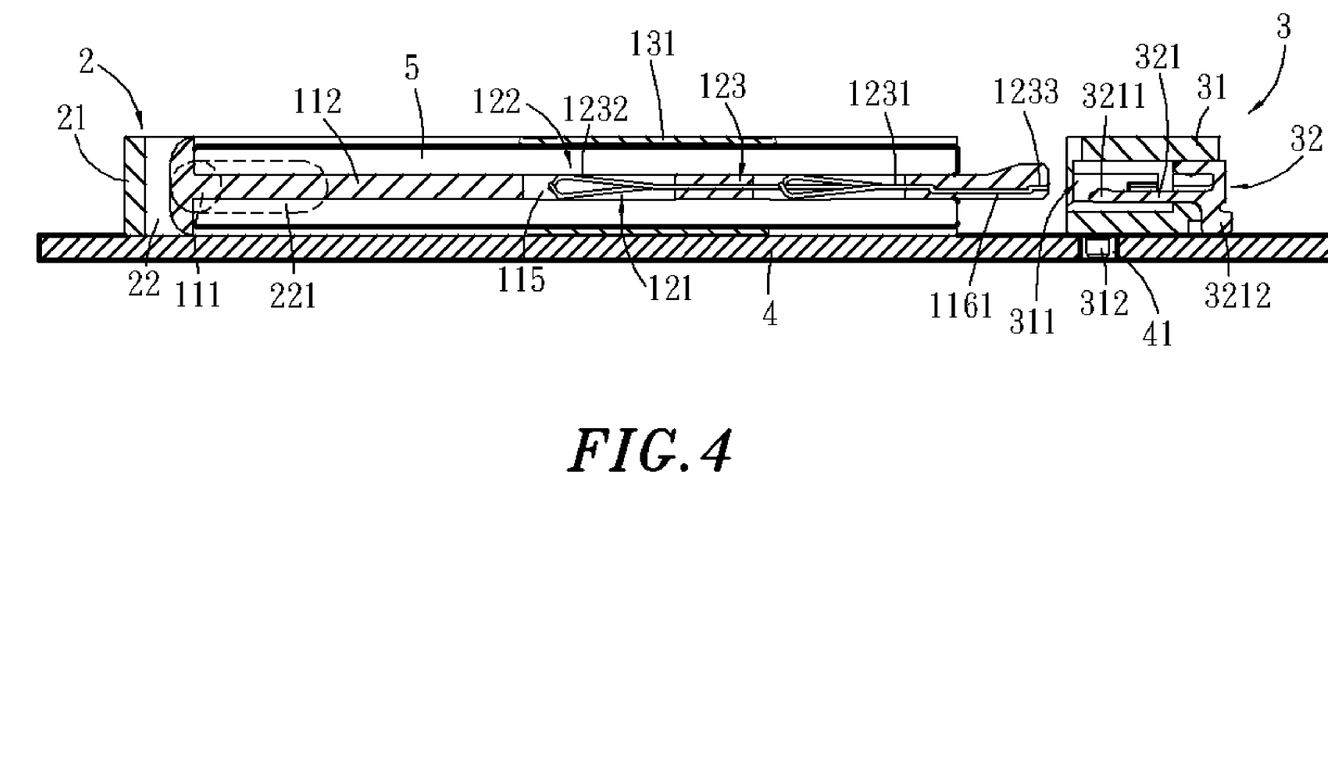
FIG. 4 is a sectional side view of the present invention, showing a memory card installed therein.
Figure 5:
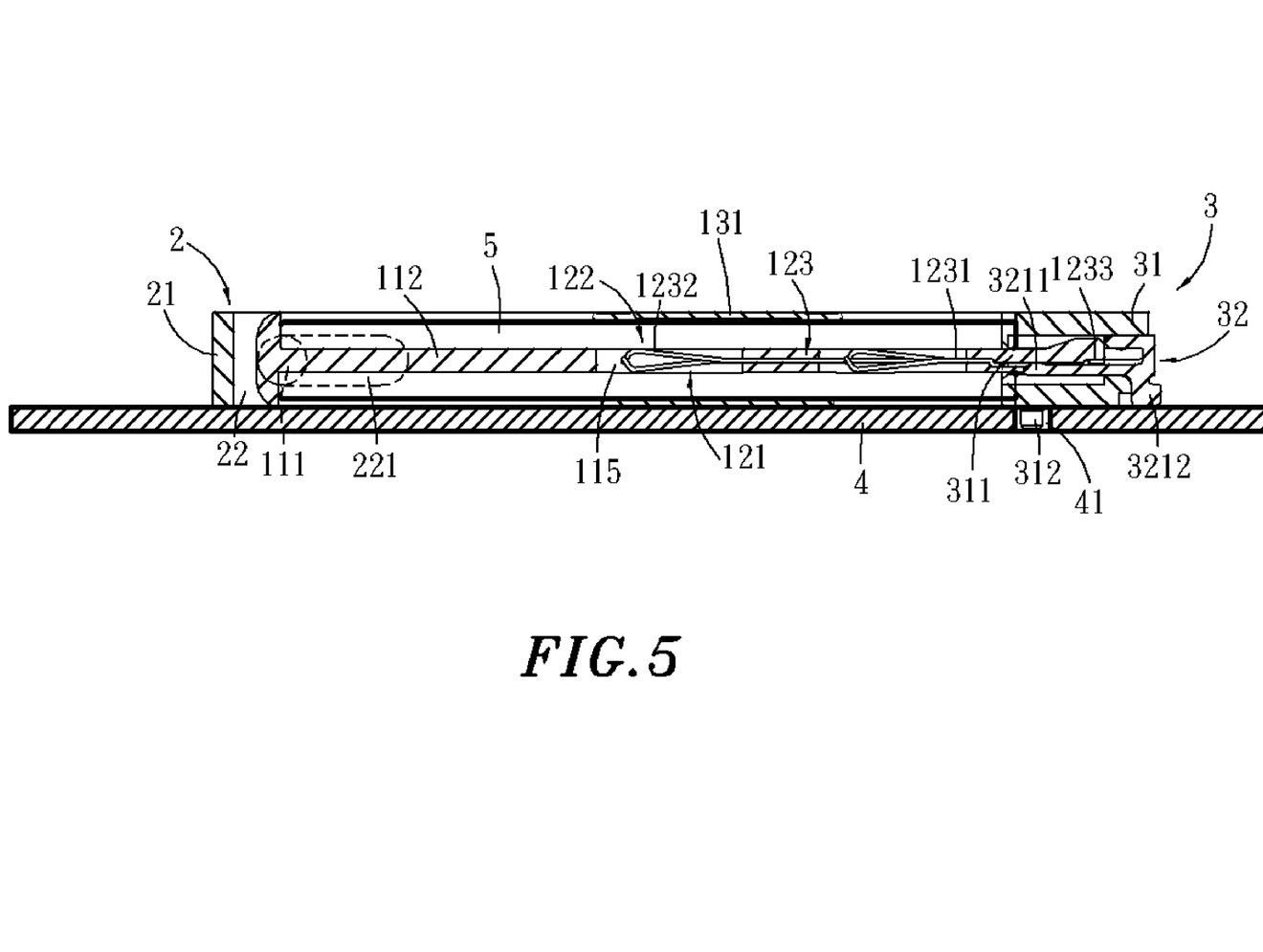
FIG. 5 is a sectional side view showing the sliding cardholder connected to the connector according to the present invention.

Referring to FIGS. 4 and 5 and FIG. 3 again, when in use, the sliding cardholder 1 is turned upwards from the circuit board 4 to a tilted position, and then prepared electronic cards 5 are respectively inserted into the first accommodating chamber 113 and the second accommodating chamber 114 inside the sliding cardholder 1 to keep the respective contacts (not shown) thereof in close contact with the front contact portions 1232 of the terminals 123 of the first terminal set 121 and second terminal set 122 of the terminal unit 12 of the sliding cardholder 1. Because the cover 13 has the top and bottom panels 131 thereof respectively suspending at the bottom side of the first accommodating chamber 113 and the top side of the second accommodating chamber 114, the cover 13 prohibits the inserted electronic cards 5 from falling out of the sliding cardholder 1. After insertion of the electronic cards 5 into the sliding cardholder 1, the sliding cardholder 1 is lowered to the circuit board 4 and then moved toward the connector 3 to insert the plug plate 116 into the front receiving chamber 311 of the housing 31 of the connector 3, enabling the front contact portions 3211 of the terminals 321 of the terminal unit 32 of the connector 3 to be respectively engaged into the terminal grooves 1161 and kept in close contact with the rear connecting portions 1233 of the terminals 123 of the first terminal set 121 and second terminal set 122 of the terminal unit 12 of the sliding cardholder 1. After electric connection between the respective front contact portions 3211 and the respective rear connecting portions 1233, the front contact portions 3211 of the terminals 321 of the terminal unit 32 of the connector 3 are respectively protected in the respective terminal grooves 1161 against deformation.

Figure 6:
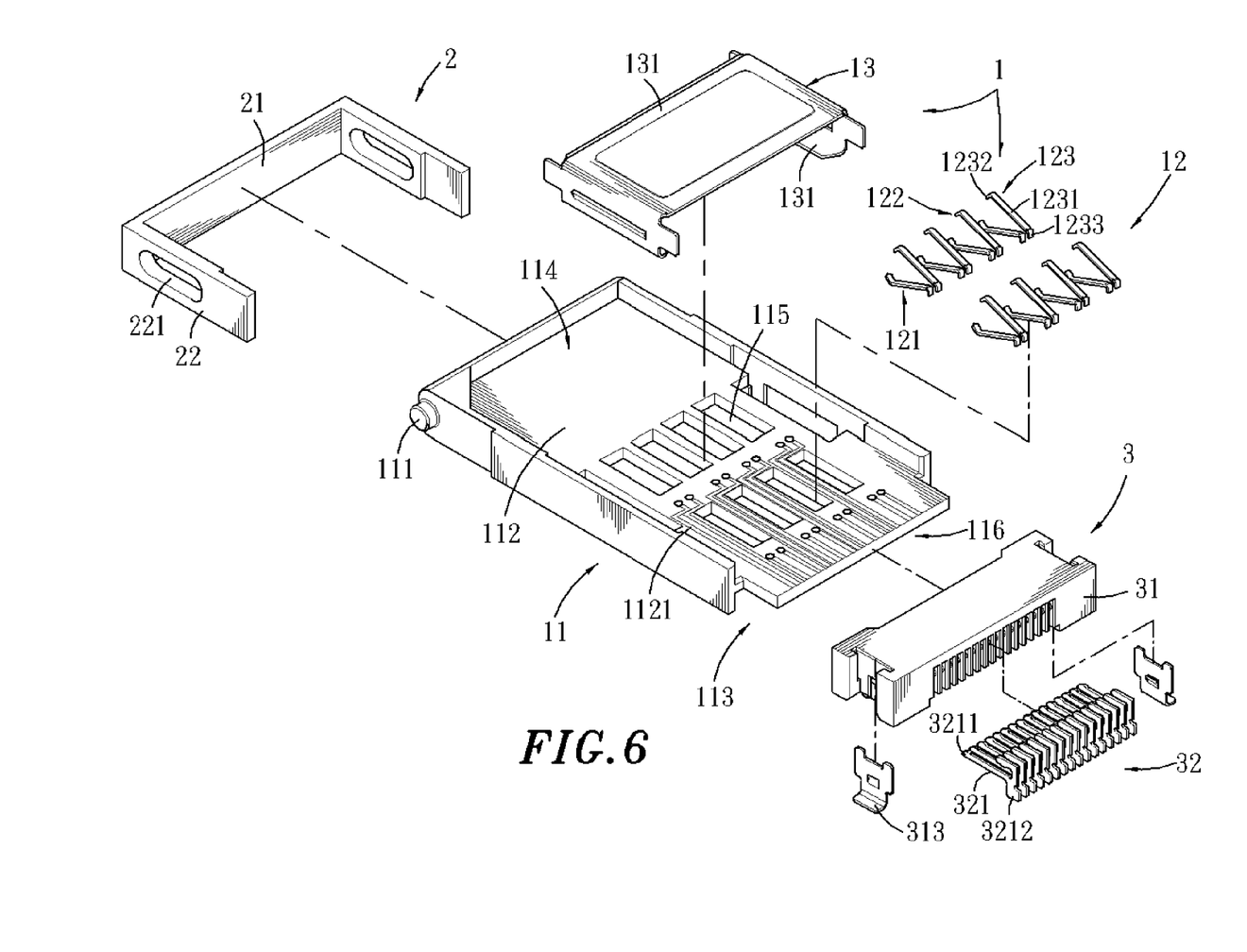
FIG. 6 is an exploded view of an alternate form of the card adapter according to the present invention.
Figure 7:
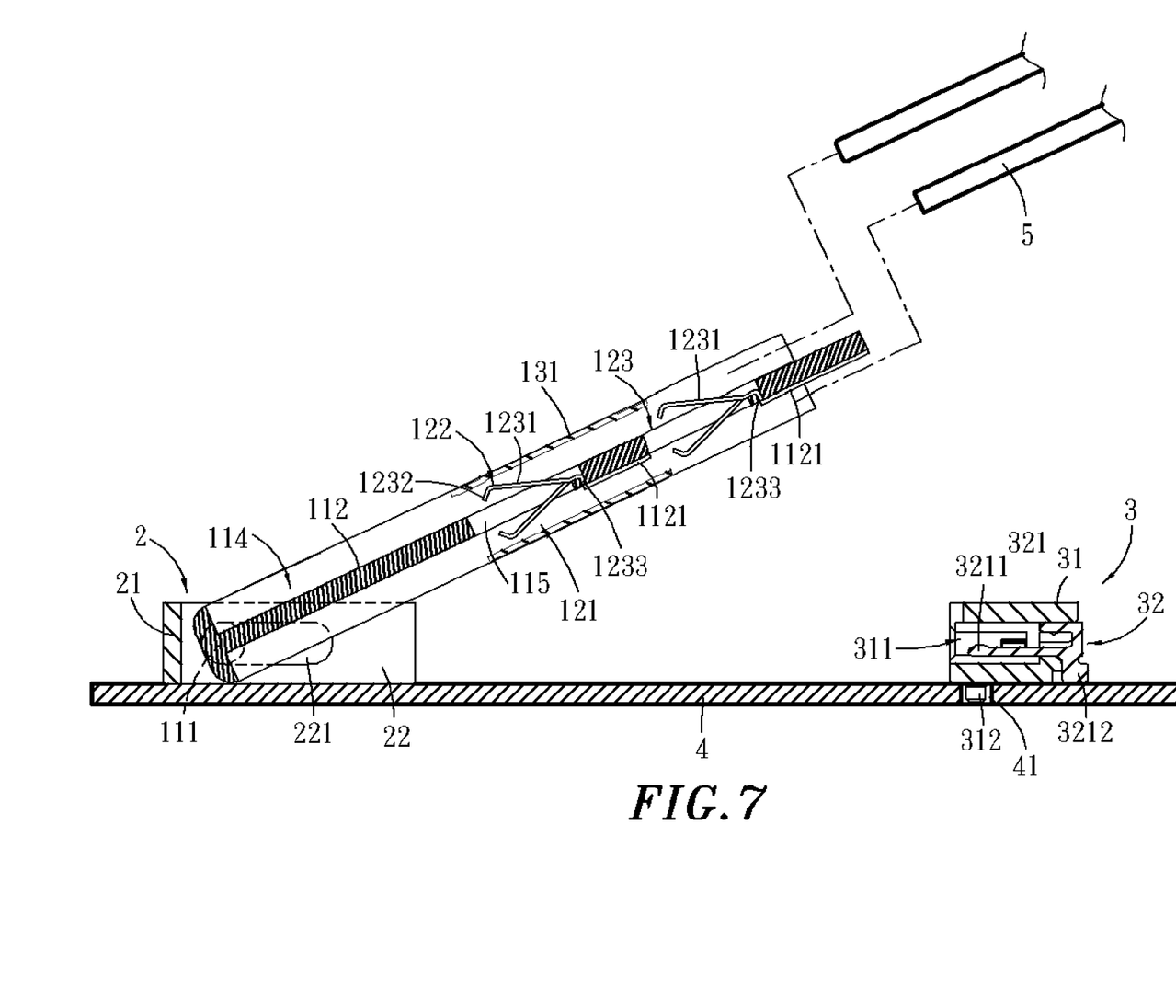
FIG. 7 is a sectional side view of the card adapter shown in FIG. 6.

FIGS. 6 and 7 show an alternate form of the card adapter according to the present invention. According to this embodiment, the partition board 112 is a circuit board having a circuit 1121 printed thereon and extending to the plug plate 116 for direct contact with the front contact portions 3211 of the terminals 321 of the terminal unit 32 of the connector 3; the rear connecting portions 1233 of the terminals 123 are respectively bonded to the circuit 1121 at the partition board 112.

Figure 8:
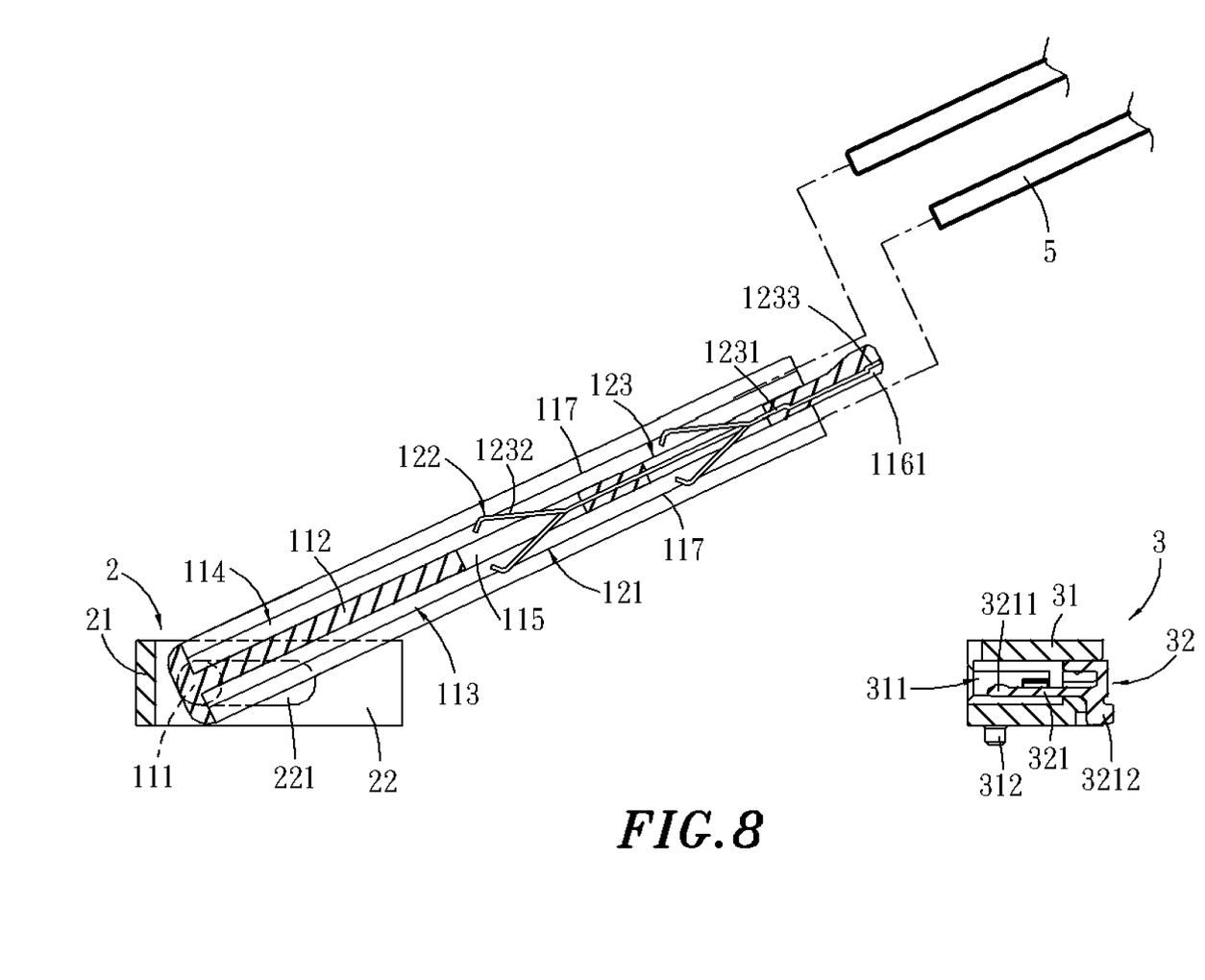
FIG. 8 is a sectional side view of another alternate form of the card adapter according to the present invention.

FIG. 8 shows another alternate form of the card adapter according to the present invention. Sliding grooves 117 are respectively and symmetrically provided inside the first accommodating chamber 113 and the second accommodating chamber 114. By means of the sliding grooves 117, the electronic cards 5 are respectively positively inserted into the first accommodating chamber 113 and the second accommodating chamber 114. Because the electronic cards 5 are positioned in the sliding grooves 117, they will not fall out of the sliding cardholder 1.

Further, the electronic cards 5 can be SIM (Subscriber Identity Module) cards, or memory cards, for example, SM (SmartMedia) cards, CF (CompactFlash) cards, or xD-picture cards.

As indicated above, the invention provides a card adapter, which has the following features:

(1) The sliding cardholder has the terminals respectively mounted in the partition board, enabling the terminals to contact the inserted electronic cards in the first accommodating chamber and the second accommodating chamber. This design greatly minimizes the height of the card adapter, thereby meeting the requirements for light, thin, short and small electronic device characteristics.

(2) The sliding cardholder has the terminals installed in the partition board and extended to the plug plate for connection to the respective terminals in the connector. This design allows a relatively greater locational tolerance, thereby simplifying the fabrication to reduce the manufacturing cost and to improve the yield rate.

(3) The terminal grooves of the plug plate of the sliding cardholder guide the respective terminals of the sliding cardholder into positive contact with the respective terminals of the connector, and protect the front contact portions of the terminals of the connector against deformation after electric connection, thereby prolonging the service life of the card adapter.

A prototype of card adapter has been constructed with the features of FIGS. 1~8. The card adapter functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A card adapter comprising a connector mounted in a circuit board and electrically connected to said circuit board, a locating frame fixedly mounted in said circuit board, and a sliding cardholder coupled to said locating frame and adapted to hold a plurality of electronic cards and to electrically connect the electronic cards to said connector, wherein:

said sliding cardholder comprises a holder base pivotally movably coupled to said locating frame, and a plurality of metal terminals respectively mounted in said holder base, said holder base comprising a first accommodating chamber at a bottom side thereof for receiving a first electronic card, a second accommodating chamber at a top side thereof for receiving a second electronic card, a partition board set between said first accommodating chamber and said second accommodating chamber, and a plug plate extending from one end of said partition board to the outside of said holder base and insertable into said connector, the terminals of said sliding cardholder each having a front contact portion and a rear connecting portion, the front contact portions of the terminals of said sliding cardholder being respectively suspending in said first accommodating chamber and said second accommodating chamber for the contact of respective contacts of the inserted electronic cards in said first accommodating chamber and said second accommodating chamber, the rear connecting portions of the terminals of said sliding cardholder being respectively extending to said plug plate for insertion with said plug plate into said connector;

said connector comprises an electrically insulative housing fixedly fastened to said circuit board, said electrically insulative housing having a front receiving chamber adapted to receive said plug plate of said sliding cardholder, and a plurality of terminals respectively mounted in said electrically insulative housing, the terminals of said connector each comprising a front contact portion respectively suspended in said front receiving chamber for the contact of the rear connecting portions of the terminals of said sliding cardholder and a rear bonding portion respectively soldered to a respective contact at said circuit board.

2. The card adapter as claimed in claim 1, wherein said locating frame comprises two parallel arms, said arms each having an elongated sliding slot; said holder base of said sliding cardholder comprises two pivot rods symmetrically disposed at two opposite lateral sides thereof and respectively coupled to the elongated sliding slots of said locating frame.

3. The card adapter as claimed in claim 1, wherein said partition board has a plurality of slots disposed in communication between said first accommodating chamber and said second accommodating chamber for the passing of the terminals of said sliding cardholder.

4. The card adapter as claimed in claim 1, wherein said plug plate has a plurality of terminal grooves arranged in parallel; the rear connecting portions of the terminals of said sliding cardholder are respectively positioned in said terminal grooves.

5. The card adapter as claimed in claim 1, wherein said electrically insulative housing of said connector has a plurality of bottom mounting rods for fastening to respective mounting through holes at said circuit board.

6. The card adapter as claimed in claim 1, wherein said electrically insulative housing has two metal grounding plates fixedly provided at two sides thereof for connecting to respective grounding contacts at said circuit board.

7. The card adapter as claimed in claim 1, wherein said holder base of said sliding cardholder comprises a plurality of sliding grooves respectively symmetrically provided inside said first accommodating chamber and said second accommodating chamber for guiding inserted electronic cards into said first accommodating chamber and said second accommodating chamber respectively.

8. The card adapter as claimed in claim 1, wherein said sliding cardholder further comprises a cover fastened to said holder base, said cover comprising top and bottom panels respectively extending over top and bottom sides of said second accommodating chamber and said first accommodating chamber.

9. A card adapter comprising a connector mounted in an external circuit board and electrically connected to said external circuit board, a locating frame fixedly mounted in said external circuit board, and a sliding cardholder coupled to said locating frame and adapted to hold a plurality of electronic cards and to electrically connect the electronic cards to said connector, wherein:

said sliding cardholder comprises a holder base pivotally movably coupled to said locating frame, and a plurality of metal terminals respectively mounted in said holder base, said holder base comprising a first accommodating chamber at a bottom side thereof for receiving a first electronic card, a second accommodating chamber at a top side thereof for receiving a second electronic card, an internal circuit board set between said first accommodating chamber and said second accommodating chamber, and a plug plate extending from one end of said internal circuit board to the outside of said holder base and insertable into said connector, the terminals of said sliding cardholder each having a rear end respectively soldered to said internal circuit board and a front contact portion, the front contact portions of the terminals of said sliding cardholder being respectively suspending in said first accommodating chamber and said second accommodating chamber for the contact of respective contacts of the inserted electronic cards in said first accommodating chamber and said second accommodating chamber;

said connector comprises an electrically insulative housing fixedly fastened to said external circuit board, said electrically insulative housing having a front receiving chamber adapted to receive said plug plate of said sliding cardholder, and a plurality of terminals respectively mounted in said electrically insulative housing, the terminals of said connector each comprising a front contact portion respectively suspended in said front receiving chamber for connection to the terminals of said sliding cardholder electrically upon insertion of said plug plate into said front receiving chamber and a rear bonding portion respectively soldered to a respective contact at said external circuit board.

10. The card adapter as claimed in claim 9, wherein said locating frame comprises two parallel arms, said arms each having an elongated sliding slot; said holder base of said sliding cardholder comprises two pivot rods symmetrically disposed at two opposite lateral sides thereof and respectively coupled to the elongated sliding slots of said locating frame.

11. The card adapter as claimed in claim 9, wherein said plug plate is provided with an electric circuit that is electrically connected to the terminals of said sliding cardholder at said internal circuit board for the contact of the front contact portions of the terminals of said connector.

12. The card adapter as claimed in claim 9, wherein said electrically insulative housing of said connector has a plurality of bottom mounting rods for fastening to respective mounting through holes at said circuit board.

13. The card adapter as claimed in claim 9, wherein said electrically insulative housing has two metal grounding plates fixedly provided at two sides thereof for connecting to respective grounding contacts at said external circuit board.

* * * * *